US008124561B2

(12) United States Patent
Bool, III et al.

(10) Patent No.: US 8,124,561 B2
(45) Date of Patent: Feb. 28, 2012

(54) PRODUCTION OF ACTIVATED CHAR USING HOT GAS

(75) Inventors: Lawrence E. Bool, III, East Aurora, NY (US); Chien-Chung Chao, Williamsville, NY (US); Mark K. Weise, Orchard Park, NY (US); Jurron L. D. Bradley, Buffalo, NY (US)

(73) Assignee: Praxair Technology, Inc., Danbury, CT (US)

( * ) Notice: Subject to any disclaimer, the term of this patent is extended or adjusted under 35 U.S.C. 154(b) by 67 days.

(21) Appl. No.: 12/732,813

(22) Filed: Mar. 26, 2010

(65) Prior Publication Data
US 2010/0179057 A1 Jul. 15, 2010

Related U.S. Application Data

(60) Division of application No. 11/224,590, filed on Sep. 12, 2005, now Pat. No. 7,704,921, which is a continuation-in-part of application No. 11/078,517, filed on Mar. 14, 2005, now abandoned.

(51) Int. Cl.
*C01B 31/10* (2006.01)
(52) U.S. Cl. ..................................... 502/417
(58) Field of Classification Search ................... 502/417
See application file for complete search history.

(56) References Cited

U.S. PATENT DOCUMENTS

| 1,984,164 | A | | 12/1934 | Karlsruhe |
| 3,758,037 | A | | 9/1973 | Marion et al. |
| 3,886,093 | A | | 5/1975 | Dimitri |
| 3,958,957 | A | | 5/1976 | Koh et al. |
| 4,107,084 | A | | 8/1978 | Repik et al. |
| 4,159,306 | A | | 6/1979 | Borst |
| 4,242,226 | A | | 12/1980 | Siren |
| 4,273,619 | A | | 6/1981 | Angelo, II |
| 4,475,986 | A | | 10/1984 | Smith |
| 4,500,327 | A | | 2/1985 | Nishino et al. |
| 4,551,155 | A | | 11/1985 | Wood et al. |
| 4,603,119 | A | | 7/1986 | Karl et al. |
| 4,692,380 | A | | 9/1987 | Reid |
| 4,894,122 | A | * | 1/1990 | Lazcano-Navarro et al. .. 201/17 |
| 5,096,570 | A | | 3/1992 | Utz et al. |
| 5,168,088 | A | | 12/1992 | Utz et al. |
| 5,187,141 | A | * | 2/1993 | Jha et al. ........................ 502/432 |
| 5,212,144 | A | | 5/1993 | Schwartz, Jr. |
| 5,266,024 | A | | 11/1993 | Anderson |
| 5,275,853 | A | | 1/1994 | Silvis et al. |
| 5,276,000 | A | | 1/1994 | Matthews et al. |
| 5,292,708 | A | | 3/1994 | Karl |
| 5,382,559 | A | | 1/1995 | Carugati et al. |
| 5,403,548 | A | | 4/1995 | Aibe et al. |
| 5,425,996 | A | | 6/1995 | Wilkie et al. |
| 5,435,980 | A | | 7/1995 | Felsvang et al. |
| 5,444,031 | A | | 8/1995 | Hayden |
| 5,510,565 | A | | 4/1996 | Tan et al. |
| 5,556,447 | A | | 9/1996 | Srinivasachar et al. |
| 5,614,459 | A | | 3/1997 | Mondragon et al. |
| 5,698,317 | A | | 12/1997 | Kurokawa et al. |
| 5,787,823 | A | | 8/1998 | Knowles |
| 6,027,551 | A | | 2/2000 | Hwang et al. |
| 6,033,786 | A | | 3/2000 | Fatica et al. |
| 6,136,749 | A | | 10/2000 | Gadkaree et al. |
| 6,206,949 | B1 | | 3/2001 | Kobayashi et al. |
| 6,395,145 | B1 | | 5/2002 | Altman |
| 6,439,139 | B1 | | 8/2002 | Jones |
| 6,451,094 | B1 | | 9/2002 | Chang et al. |
| 6,521,021 | B1 | | 2/2003 | Pennline et al. |
| 6,533,842 | B1 | | 3/2003 | Maes et al. |
| 6,534,442 | B1 | | 3/2003 | Vaughn et al. |
| 6,589,621 | B1 | | 7/2003 | Beckerdite et al. |
| 6,595,147 | B2 | | 7/2003 | Teller et al. |
| 6,638,489 | B2 | | 10/2003 | Otsuka et al. |
| 6,719,956 | B1 | * | 4/2004 | Gaur et al. ................ 423/445 R |
| 6,726,888 | B2 | | 4/2004 | Lanier et al. |
| 6,797,251 | B1 | * | 9/2004 | Bennett et al. ............ 423/445 R |
| 6,841,513 | B2 | | 1/2005 | El-Shoubary et al. |
| 6,878,358 | B2 | | 4/2005 | Vosteen et al. |
| 6,953,494 | B2 | | 10/2005 | Nelson, Jr. |
| 7,029,734 | B1 | | 4/2006 | Wuest et al. |
| 7,195,818 | B2 | | 3/2007 | Kong et al. |
| 7,704,921 | B2 | | 4/2010 | Bool, III et al. |
| 7,767,007 | B2 | | 8/2010 | Chao |
| 2005/0039598 | A1 | | 2/2005 | Srinivasachar |
| 2006/0204430 | A1 | | 9/2006 | Bool, III et al. |
| 2008/0107579 | A1 | | 5/2008 | Downs et al. |
| 2008/0193763 | A1 | | 8/2008 | Hunt et al. |

FOREIGN PATENT DOCUMENTS

| EP | 0 327 039 | 8/1989 |
| EP | 0433677 | 6/1991 |
| JP | 2004-1688836 | 6/2004 |

OTHER PUBLICATIONS

Blankinship, S., "Mercury Control Now on the Table", Power Engineering, pp. 22-32, May 2005. Durham, M., "Sorbent Injection Making Progress", Power, pp. 64-67, Oct. 2004.
Freeman, J.J., "Studies of Activated Charcoal Cloth, V. Modification of Pore Structure by Impregnation With Certain Transition Metal Salts and Oxo-Complexes", Carbon, vol. 27, No. 1, pp. 85-93 (1989).
Hammel, C., "Pahlman Process Shows Promise", Power, pp. 60-63, Oct. 2004.
Howard, D.G., "Mossbauer Study of Cobalt Ions Adsorbed From Solution Onto Activated Charcoal", Carbon, vol. 26, No. 4, pp. 559-563 (1988).
Ley, T., "Assessment of Low Cost Novel Sorbents for Coal-Fired Power Plant Mercury Control", Quarterly Technical Progress Report, Apogee Scientific, Inc. pp. 1-5, Jul. 2003.
Offen, G., "Covering All the Bases", Power, pp. 38-42, Oct. 2004.
Sjostrom, S., et al., "Assessing Sorbents for Mercury Control in Coal-Combustion Flue Gas", Journal of the Air and Waste Management Association, vol. 52, p. 902-911 (Aug. 2002).
Pavlish, J.H., et al., "JV Task 45—Mercury Control Technologies for Electric Utilities Burning Lignite Coal, Phase I Bench- and Pilot-Scale Testing", Final Report, pp. 1-57, Oct. 2003.

(Continued)

Primary Examiner — Stuart Hendrickson
(74) Attorney, Agent, or Firm — Donald T. Black

(57) ABSTRACT

A gas mixture preheated to high temperatures using an oxy-fuel, an oxygen-enriched air-fuel or an air-fuel burner is used to devolatilize and partially oxidize carbonaceous feedstock, thereby producing an active residual char that can be used in applications utilizing activated carbon. Use of hot gas and ground carbonaceous feedstock allows the equipment to be minimized, thereby allowing the activated carbon to be produced at or near points of use, for example the production of activated char at or near utility boilers for use in the reduction of mercury emissions from flue gas streams.

7 Claims, 3 Drawing Sheets

OTHER PUBLICATIONS

U.S. Appl. No. 60/425,236, filed Nov. 5, 2002, Hunt.

Rezaiyan et al, "Gasification Technologies A Primer for Engineers and Scientists", pp. 5-16, 35-63, 87-117, Text copyright 2005.

Higman et al, "Gasification", pp. 12 and Chapters 3-5, Text copyright 2003.

Peri, "Assessment of the Commercial Potential For Small Gasification Combined Cycle and Fuel Cell Systems Phase II Final Draft Report", pp. 12, 46-52, 55-58, Mar. 2003.

DOE published paper, "Development of Activated Carbons from Coal Combustion By-Products", DOE award No. DE-FG26-99FT40593, pp. 1-25, Sep. 2003.

Bool, et al, "Production of Powdered Activated Carbon for Mercury Capture Using Hot Oxygen", MEGA Symposium, Baltimore MD, 2008.

DOE published paper "Development of Activated Carbons from Coal Combustion by-Products", DOE award No. DE-FG26-99FT40593, Jul. 2000.

"Surface treating: how and how much", Converting Magazine, pp. 36, 38, 40 and 42, Dec. 1994.

\* cited by examiner

PRODUCTION OF ACTIVATED CHAR USING HOT GAS

CROSS-REFERENCE TO RELATED APPLICATION

This application is a divisional of, and claims priority from, U.S. application Ser. No. 11/224,590, filed Sep. 12, 2005 now U.S. Pat. No. 7,704,921, which is a continuation-in-part application of, and claims priority from, U.S. application Ser. No. 11/078,517, filed Mar. 14, 2005 now abandoned, the entire contents of which are incorporated herein by reference.

TECHNICAL FIELD

The present invention relates generally to methods and systems to produce activated char such that production can occur at or near the end use point.

BACKGROUND OF THE INVENTION

Activated carbon is a widely used adsorbent in industrial processes to remove contaminants from gas or liquid streams. For example, attempts to meet currently pending mercury emissions limits for fossil fuel fired power plants by injecting powdered activated carbon (PAC) into the flue gas upstream of a particulate control device in order to remove contaminants from the flue gas are being investigated.

The removal of mercury from flue gas streams from combustion processes is of significant interest. The toxicity of mercury to humans has long been known. An example of the devastating effects of mercury exposure occurred in Minamata, Japan in the 1950's where organic mercury byproducts of acetaldehyde production were discharged into the local bay, and were ingested and metabolized by fish. By consuming fish in the bay, wide spread neurological damage and birth defects to the local population were reported.

Coals used for various combustion processes typically contain about 0.1 ppm mercury. In the United States alone, about 50 tons of mercury are discharged as vapor in stack gas every year. Through chemical and biological processes, such mercury can become concentrated by many thousand-fold into fish, thus entering human food supplies at harmful levels. In December 2000, the Environmental Protection Agency (EPA) made its regulatory decision that mercury emissions from coal-fired electric generating plants need to be controlled.

One barrier to the use of adsorbents, however, has been the high cost of both producing and shipping PAC to the end use point. PAC is typically produced from carbonaceous starting materials such as coal, wood, biomass materials, nutshells (e.g., walnut shells, palm nut) or nut hulls (e.g., coconut) that initially do not have high adsorptive characteristics. The carbonaceous starting materials are converted into PAC materials exhibiting higher adsorptive properties by energy and capital intensive processes that include pyrolyzing the feedstock in a rotary kiln, activating the carbon with an activation media (i.e. steam), and grinding or pulverizing the resulting char. The activated carbon material must then be shipped to its end use point, such as a coal-fired power plant.

Attempts to produce PAC near an end use point have been made. For instance, the use of a combustion process to produce char for mercury control has been discussed in the patent literature. U.S. Pat. No. 6,451,094 B1 to Chang, et al. discuss injecting a feedstock into a hot flue gas and activating the feedstock in situ.

U.S. Pat. No. 6,595,147 to Teller et al. relates to adding a carbonaceous char to the flue gas while it is still within a resource recovery unit at a temperature high enough to devolatilize the material to form activated char in situ.

Attempts have also been made to use carbon found in fly ash to capture mercury from flue gas in coal-fired processes. U.S. Pat. No. 5,787,823 to Knowles proposes a method in which carbon-containing fly ash is captured in a cyclone upstream of a conventional particulate control device (PCD). The captured material is then injected into a duct to capture mercury. U.S. Pat. No. 6,027,551 to Hwang, et al. teach separation of the carbon from fly ash captured in a conventional PCD and injection of the carbon-rich portion as a mercury sorbent.

U.S. Pat. No. 6,521,021 B1 to Pennline et al. teach removing partially oxidized coal from the combustion zone of a boiler. The coal is separated out and injected further downstream as a mercury sorbent.

Lanier, et al. (U.S. Pat. No. 6,726,888 B2) suggest controlling the combustion process such that both the NOx emissions and the characteristics of the native fly ash for mercury removal are controlled.

Given both the constraints of normal boiler operation, and the fact that the activity of the native residual carbon decreases as it moves through the boiler, separate production processes for activated carbon can provide a better opportunity to produce activated carbon having characteristics favorable for an intended and particular end use. It would therefore be desirable to provide systems and methods for onsite production of activated carbon suitable for a wide range of processes, thereby improving the cost and efficiency of activated carbon production use.

BRIEF SUMMARY OF THE INVENTION

The present invention provides methods and systems for production of activated char that are sufficiently flexible and efficient such that production can occur near or at the end use site of the activated char. The methods and systems provided herein can also be used in other arrangements. For example, the present invention can be implemented for a central facility to produce activated char as described herein and to serve multiple utilities or the like. In another implementation, the present invention can be used by a utility to make activated char for its own plant and ship excess activated char to other locations.

Such methods and systems include preheating a gas mixture to high temperatures using an oxy-fuel, an oxygen-enriched air-fuel or an air-fuel burner to form a hot gas stream. The hot gas stream is mixed and reacted with a carbonaceous feedstock (i.e. carbonaceous raw material) in a manner such that the carbonaceous feedstock is devolatilized and partially combusted to thereby produce an active residual char that can be implemented in a variety of applications that use activated carbon.

Use of hot gas and ground carbonaceous feedstock allow the equipment to be minimized, thus allowing the activated carbon to be produced at or near the point of use, for example to reduce utility boiler mercury emissions from flue gas.

The present invention includes a method to produce activated char at or near the end use point. A hot (preferably about 2000-3000° F.) oxidizing gas stream mixes and reacts with a ground or pulverized carbonaceous feedstock to create powdered activated char with adsorbent properties similar to powdered activated carbon produced with the same carbonaceous feedstock. Alternatively, an inert gas could be heated and used to pyrolize the feedstock. In yet another alternative, by adjusting oxygen and fuel ratio, the hot gas stream could have any desirable oxygen content or no oxygen at all (e.g. $CO_2$ and/or H₂O). It could be strongly oxidative, mildly oxidative or even reductive. For example, a heat source for thermal treatment of the carbonaceous feedstock may be suitable for use in the present invention. It will be appreciated by those skilled in the art that such adsorptive properties are dependent on the feedstock utilized. It will also appreciated by those skilled in the art that while adsorptive properties of an activated char may be sufficient for some applications, the activated char may need to be altered for other applications.

The present invention thus provides several benefits including, but not limited to, the ability to produce activated char at or near the end use point, lower cost and more efficient production methods for activated char relative to large, rotary kiln methods and an option to use a carbonaceous feedstock for producing activated char that may be different from the fuel used in the main combustion process of a given facility. Consequently, the present invention provides the flexibility to alter activated char properties for a specific application at or near the end use point.

The surface area of the activated char produced in accordance with the present invention may be less than, and in some cases significantly less than the surface area of currently and commercially available PACs. Given the efficient and flexible methods provided herein, however, the overall economics may still favor use of activated char produced in accordance with the present invention, even in situations where more activated char may be necessary relative to currently and commercially available PACs.

The hot gas stream, which can include steam, oxygen, or mixtures of gasses, is produced by preheating a gas stream with an oxy-fuel, an oxygen-enriched air-fuel or an air-fuel burner to create a hot gas mixture. The high turbulence from the hot-gas serves to rapidly mix the carbonaceous feedstock with the hot-gas. In a preferred embodiment of the invention, the elevated temperature and the oxygen concentration of the hot gas cause rapid ignition, devolatilization and partial oxidation of the carbonaceous feedstock.

Because both elevated temperature and high oxygen concentrations have been shown to significantly increase the devolatilization rate of carbonaceous fuels, the use of hot oxidizing gas reduces the residence time required to produce the activated carbon material. Consequently, small reactors can be used to replace the large rotary kilns typically used to produce activated carbon. In addition, by-products (such as CO and H₂) produced in accordance with this process can be used either as fuel for the main boiler or as a reburning fuel.

The present invention provides methods and systems for separating activated char production from the main combustion process, thereby making it possible to produce activated char having properties (e.g., adsorptive) desirable for a specific application. For example and while not to be construed as limiting, the present invention enables the onsite (or near end use) production of activated char for a pulverized fuel-fired utility for the removal of mercury in a flue gas stream. Alternatively or in addition, the present invention enables the production of activated char to be tailored for use in a fixed bed arrangement for waste water treatment to remove hydrocarbons and other contaminants. Another advantage of the present invention is the ability to use the partial oxidation gas as a useful fuel in the process, either by recirculating this material to the hot gas burner or by firing it into a boiler that may, or may not, be part of the process. For example, the gas products could be sent to the boiler as a reburning fuel for NO$_x$ control.

As discussed above, the hot oxygen or hot gas burner as used in accordance with the present invention allows for on-site activated char production. The combination of high temperatures and good mixing achieved with this burner allows activated char production with relatively small, simple process equipment (especially as compared to the rotary kilns currently used to produce PAC). Moreover, activation of the activated char of the present invention occurs as a result of the process as opposed to rotary kiln methods which typically require separate activation steps.

Accordingly, the present invention can significantly reduce the cost of activated char for the end user by both improving the production efficiency and versatility as well as minimizing shipping requirements.

BRIEF DESCRIPTION OF THE DRAWINGS

For a more complete understanding of the present invention and the advantages thereof, reference should be made to the following Detailed Description taken in conjunction with the accompanying drawings in which.

Similar reference characters refer to similar parts throughout the several views of the drawings.

DETAILED DESCRIPTION

Figure 1:
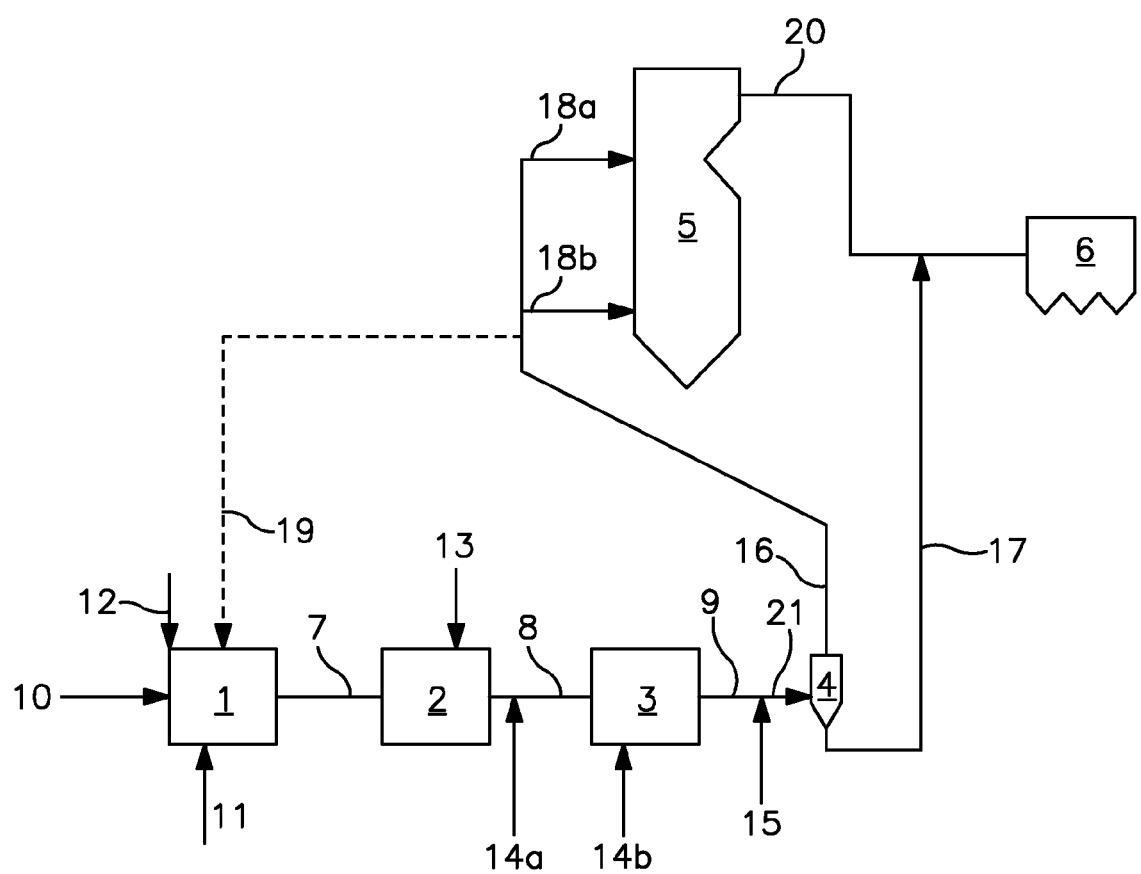
FIG. 1 illustrates a schematic view of apparatus to produce activated carbon in accordance with one embodiment of the present invention.

The present invention provides methods and systems for production of activated char near or at the end use point of the activated char. Such methods and systems include preheating a gas mixture to high temperatures using an oxy-fuel, an oxygen-enriched air-fuel or an air-fuel burner to form a hot gas stream. The hot gas stream is mixed and reacted with a carbonaceous feedstock (i.e. carbonaceous raw material) in a manner such that the carbonaceous feedstock is devolatilized and partially combusted to thereby produce an active residual char that can be implemented in applications that use activated carbon.

Use of hot gas and ground carbonaceous feedstock allow the equipment to be minimized, thus allowing the activated carbon to be produced at or near the point of use, for example to reduce utility boiler mercury emissions from flue gas.

The present invention includes a method to produce activated char at or near the end use point. A hot (preferably, 2000-3000° F.) oxidizing gas stream mixes and reacts with a ground or pulverized carbonaceous feedstock to create powdered activated char with adsorbent properties similar to activated char produced with the same carbonaceous feedstock from typical methods such as rotary kiln processes. It will be appreciated by those skilled in the art that such adsorptive properties are dependent on the feedstock utilized. It will also be appreciated by those skilled in the art that while adsorptive properties of an activated char may be sufficient for some applications, the activated char may need to be altered for other applications.

The present invention thus provides several benefits including, but not limited to, the ability to produce activated char at or near the end use point, lower cost and more efficient production methods for activated char relative to large, rotary kiln methods and an option to use a carbonaceous feedstock for producing activated char that may be different from the coal used in the main combustion process of a given facility.

Consequently, the present invention provides the flexibility to alter activated char properties for a specific application at or near the end use point.

The hot gas stream, which can include steam, oxygen, or mixtures of gasses, is produced by preheating a gas stream with an oxy-fuel, an oxygen-enriched air-fuel or an air-fuel burner to create a hot gas mixture. The gas mixture is then rapidly mixed with the carbonaceous feedstock. In a preferred embodiment of the invention, the elevated temperature and the oxygen concentration of the hot gas cause rapid ignition, devolatilization and partial oxidation of the carbonaceous feedstock.

Because both elevated temperature and high oxygen concentrations have been shown to significantly increase the devolatilization rate of carbonaceous fuels, the use of hot oxidizing gas reduces the residence time required to produce the activated carbon material. Consequently, small reactors can be used to replace the large rotary kilns typically used to produce activated carbon. In addition, by-products (such as CO and $H_2$) produced in accordance with this process can be used either as fuel for the main boiler or as a reburning fuel.

The present invention thus provides methods and systems for separating activated char production from the main combustion process, thereby making it possible to produce activated char having properties (e.g., adsorptive) desirable for a specific application. For example and while not to be construed as limiting, the present invention enables the production of activated char for a pulverized fuel-fired utility for the removal of mercury in a flue gas stream. Alternatively or in addition, the present invention enables the production of activated char to be tailored for use in a fixed bed arrangement for waste water treatment to remove hydrocarbons, water and other contaminants. Another advantage of the present invention is the ability to use the partial oxidation gas as a useful fuel in the process, either by recirculating this material to the hot gas burner or by firing it into a boiler that may, or may not, be part of the process. For example, the gas products could be sent to the boiler as a reburning fuel for $NO_x$ control.

As discussed above, the hot oxygen or hot gas burner as used in accordance with the present invention allows for on-site activated char production. The combination of high temperatures and good mixing achieved with this burner allows activated char production with very small, relatively simple process equipment (especially as compared to the rotary kilns currently used to produce PAC). Moreover, activation of the activated char of the present invention occurs as a result of the process as opposed to rotary kiln methods which typically require separate activation steps.

Accordingly, the present invention can significantly reduce the cost of activated carbon for the end user by both improving the production efficiency and versatility as well as minimizing shipping requirements.

As previously discussed, the present invention can be used to produce activated char suitable for a wide range of industrial processes. The optimal configuration for production of activated char for a particular application therefore depends strongly on the end use and the desired char characteristics. For purposes of illustration, ratios of hot gas to carbonaceous feedstock, residence time, temperature of the hot gas and additives to the process can be determined based on the intended end use of the activated char and economic factors.

Referring now to FIG. 1, a schematic view of apparatus to produce activated carbon in accordance with one embodiment of the present invention is shown.

Burner 1 can be used in a variety of modes, with the burner design being altered as necessary to account for the mode of operation. In one preferred embodiment, burner 1 is an oxy-fuel burner and operates on fuel 10 and oxidant source 11 to produce a very hot flue gas. In this embodiment, oxidant 11 is pure oxygen. In another embodiment, burner 1 is used in an oxygen-enriched mode of operation. More specifically, oxidant 11 has an oxygen concentration less than pure oxygen, but greater than air (e.g., an oxygen concentration of between about 21 and less than 100%). This embodiment may not be as preferred because of the presence of nitrogen in the air. The $N_2$ in the hot gas can act as a diluent for the reaction with the carbonaceous feedstock and lowers the temperature of the hot gas. In yet another embodiment, burner 1 is operated as an air burner. Oxidant 11 in this embodiment is air. This third embodiment may also be not as preferred as the oxy-fuel mode because of the presence of $N_2$ in the air. The presence of $N_2$ in the hot gas can act as a diluent for the reaction with the carbonaceous feedstock and lowers the temperature of the hot gas.

Fuel 10 and oxidant 11 are fed to hot oxygen burner 1. Exemplary fuels for fuel 10 include, but are not limited to, natural gas (NG), methane, propane, hydrogen, light oil, LPG, fuel oil and coke oven gas. Fuel 10 can be liquid, but is preferably a gas.

In some embodiments, it may be preferred to introduce reactant gas 12 into burner 1 where it is mixed and reacted with oxidant 11 and fuel 10. Reactant gas 12, which can be steam, can be used primarily to obtain a desirable composition for gas stream 7 for proper reaction with carbonaceous feedstock in reaction vessel 3. Reactant gas 12 is also used to modify the properties of the activated char produced in reaction vessel 3. For example, reactant gas 12 can be used to enhance the surface area of the resulting char produced in reaction chamber 3. It will be appreciated that reactant gas 12 may not always be necessary.

In particular embodiments where burner 1 is used in the oxy-fuel or oxygen-enriched air-fuel modes, burner 1 can be configured as a hot oxygen burner such as those disclosed in U.S. Pat. No. 5,266,024 to Anderson, the entire contents of which are incorporated herein by reference. These hot oxygen burners can produce a high velocity, hot and highly reactive gas mixture known as "hot oxygen".

Regardless of whether burner 1 is operated in an oxy-fuel, oxygen-enriched or air mode of operation, it is necessary to have a sufficient amount of oxygen in gas stream 7 to burn and partially oxidize carbonaceous feedstock 13 to thereby generate activated char having adsorptive properties for its intended end use. The oxidation potential of gas stream 7 is such that carbonaceous feedstock 13 will be partially oxidized and will not be completely consumed in order to generate the desired activated char. The amount of oxygen in gas stream 7 is accordingly adjusted based on the amount of desired reaction of feedstock 13. In order to generate the proper amount of oxygen in gas stream 7, the amount of oxidant 11 and/or fuel 10 can then be adjusted. It is important that too much oxygen not be used in order to avoid too much consumption of feedstock 13, which would result in poor product yield.

If excess oxygen relative to fuel 10 is desirable in stream 7 (for example to enhance the reaction with carbonaceous feedstock 13 when no other streams such as steam are being used), the stoichiometric ratio of oxidant 11 fed to burner 1 will be in vast excess for fuel 10. In other modes of operation, burner 1 will be operated between near stoichiometric and in vast oxygen excess of oxidant 11 to fuel 10.

Hot oxygen burner 1 produces a high temperature gas stream 7, preferably having a temperature equal to or greater than 800° F. and most preferably greater than 2000° F. The temperature of hot gas stream 7 is sufficiently high to cause the desired reaction with feedstock 13 (and any carrying material for feedstock 13). Gas stream 7 will primarily contain products of combustion (e.g., $CO_2$ and $H_2O$), residual oxygen, any unreacted gas from gas stream 12 and possibly $N_2$ if air is used as part of or all of oxidant 11. In some embodiments, gas stream 7 may contain greater than 70% by volume residual oxygen with the balance being products of combustion.

As further illustrated in FIG. 1, ground or pulverized carbonaceous feedstock 13 is fed to mixing section 2 and mixed with hot gas mixture 7. Carbonaceous feedstock 13 can be selected from a variety of carbonaceous raw materials such as a variety of coals, petroleum coke, biomass materials (e.g., saw dust) or nutshells (e.g., walnut shells, palm nut) or nut hulls (e.g., coconut). Carbonaceous feedstock 13 can be conveyed to mixing section 2 by a variety of methods.

Carbonaceous feedstock 13 may be conveyed to mixing section 2 by entrainment in a carrier gas such as air or flue gas, pneumatically supplied, in a slurry such as a water slurry. It will be appreciated by those skilled in the art that other methods of conveying feedstock 13 may also be employed, including supplying the feedstock by itself, without a carrying or conveying material. Any oxygen in the conveying stream should be accounted for in the overall ratio of oxygen to feedstock (i.e., oxygen in the conveying stream combines with the oxygen in stream 7).

The velocity of gas stream 7 produced from burner 1 and fed to mixing section 2 is sufficiently fast such that carbonaceous feedstock 13 together with any conveying material, regardless of how feedstock 13 is supplied (e.g. entrained in a carrier gas, pneumatically supplied, as a slurry) to mixer 2, will be entrained in gas stream 7.

Those skilled in the art will appreciate that carbonaceous feedstock 13 can be selected based on a variety of criteria, including the end use of the activated carbon produced in accordance with the present invention. For example, it may be desirable to use a particular pulverized coal for applications using activated carbon in a dispersed phase capture mode (e.g. capture of mercury in a flue gas stream). In contrast, it may be preferred to use a crushed coal in applications where the activated carbon is to be used in packed beds (e.g., fixed bed arrangement for waste water treatment to remove hydrocarbons and other contaminants from gas or liquid streams).

It will likewise be appreciated by those skilled in the art that the residence time in reaction vessel 3 (discussed herein) will be affected by the selection of feedstock 13. For example, the residence time for pulverized feedstocks for dispersed phase modes of adsorption may be on the order of seconds as compared to residence times for crushed feedstocks, which may be on the order of minutes. Carbonaceous feedstock 13 is thus ground or pulverized to a desirable size depending on the end use and the equipment design.

In some embodiments, it may be desirable to pretreat carbonaceous feedstock 13 with a dopant. For example, carbonaceous feedstock 13 can be pretreated with a halide salt (e.g., NaBr, KBr) such that the halide salt is dispersed in carbonaceous feedstock 13 prior to being introduced into mixing section 2. This may be beneficial in applications where the activated carbon will be used for mercury capture and removal from flue gas streams. The halide salt (e.g., KBr) can improve the activated char characteristics in this type of application. Preferred examples of such treatment can be found in commonly owned U.S. patent application Ser. No. 11/078,509, entitled "Catalytic Adsorbents For Mercury Removal From Flue Gas and Methods of Manufacture Therefor" to Chien-Chung Chao et al., filed on Mar. 14, 2005 and commonly owned U.S. patent application Ser. No. 11/224,149, entitled "Catalytic Adsorbents For Mercury Removal From Flue Gas and Methods of Manufacture Therefor" to Chien-Chung Chao et al., filed on Sep. 12, 2005, both of which are incorporated herein in their entirety by reference.

Combined stream 8 thus contains a mixture of feedstock 13 and hot reactant gas 7. Stream 8 is introduced into reactor vessel 3. Reactor vessel 3 may be a refractory lined pipe with water cooling as needed. Alternatively, water sprays could be used to control the temperature in the reactor.

As also shown in FIG. 1, other additive fluids, solids or gases 14b may be added into reaction vessel 3. Exemplary additive 14b may include, but is not limited to, steam, $N_2$, water and/or material(s) that have a specific activity for an intended use of the activated char. For instance, stream 14b may be used to adjust the temperature within reactor 3 and/or provide steam for the reaction within reactor 3. In the alternative or in addition to additive 14b, additive fluid, gas or solid (e.g., lime) 14a may also be mixed with stream 8 prior to injection into reaction vessel 3.

As previously discussed, the materials in reaction vessel 3 undergo devolatilization and partial oxidation, resulting in a product stream containing partial oxidation gasses (e.g., CO and $H_2$) and activated char. The partial oxidation gases and activated char exit reactor vessel 3 as stream 9.

Those skilled in the art will appreciate that the residence time, ratio of residual oxygen in gas stream 7 to carbonaceous feedstock, and reaction vessel 3 temperature are controlled based on carbonaceous feedstock 13 and desired characteristics of the activated char. For example, if the residence time is too long, or the ratio of hot oxygen to feedstock is too high, too much of the feedstock will be consumed. This can result in reduced product (i.e. activated char) yields. If the residence time or reaction temperatures are too low, the devolatilization and activation may be incomplete, thereby reducing product (i.e. activated char) quality.

Partial oxidation gases and activated char mixture 9 exiting reaction vessel 3 are quenched with a quenching media 15 to cool the products. In some embodiments, it may be desirable to include additives (such as a halide salt (e.g., KBr) for use of the activated char in removal of mercury from flue gas streams) in quench media 15 which are mixed with the activated char. Preferred examples of such treatment can be found in commonly owned U.S. patent application Ser. No. 11/078, 509, entitled "Catalytic Adsorbents For Mercury Removal From Flue Gas and Methods of Manufacture Therefor" to Chien-Chung Chao et al., filed on Mar. 14, 2005 and commonly owned U.S. patent application Ser. No. 11/224,149, entitled "Catalytic Adsorbents For Mercury Removal From Flue Gas and Methods of Manufacture Therefor" to Chien-Chung Chao et al., filed on Sep. 12, 2005, both of which are incorporated herein in their entirety by reference.

The quenching media could be a fog of water droplets containing the desired additive, or a gas such as nitrogen.

Cooled mixture 21 may then be separated in a cyclone (or other particulate collection device) 4. Cyclone 4 may not always be necessary, for example in direct injection modes of use (see for example, FIG. 3).

A portion or all of partial oxidation gas 16 (e.g., carbon monoxide and hydrogen) exiting cyclone 4 can then be fed to boiler 5 as a reburning fuel 18a, or returned to the combustion zone of the boiler as fuel 18b. Alternatively or in addition to using partial oxidation gas 16 as reburning fuel 18a and/or fuel 18b, a portion or all of partial oxidation gas 16 may be used in burner 1 as burner fuel 19.

The activated char produced in accordance with the invention exits cyclone 4 as stream 17 and is processed for its intended end use. When the activated char is to be used to capture mercury in a flue gas stream for example, stream 17 is entrained with a carrier gas (not shown) and injected into the flue gas at a location where the temperature is within the desired range for mercury capture. The activated char is then collected along with the fly ash in a particulate control device (PCD) 6 (e.g., electrostatic precipitator or filter fabric) similar to conventional PAC injection for mercury control. As an alternative, the activated char could be injected downstream of the PCD so that the carbon content of the flyash does not destroy the ability to sell flyash as a component for cement. In other embodiments, activated char in stream 17 is transported to its intended end use (e.g., a fixed bed for waste water treatment).

The embodiment illustrated in FIG. 1 can be altered such that many of the process steps can be combined into the actual process equipment. For example and while not to be construed as limiting, a schematic representation of a laboratory-scale system to produce activated char in accordance with the present invention is shown in FIG. 2.

In this embodiment, burner 1 and reactor 3 are combined within the process equipment. Experience has shown that carbonaceous feedstock 13 (coal in this example) ignites while still in mixing section 2 (not shown in FIG. 2), indicating ignition is extremely fast. Mixing section 2 is attached to reactor vessel 3, which is a refractory lined pipe. The design of the reactor 3 can be adjusted to account for proper residence time within the reaction zone 3. Additive fluids or gasses 14, such as water or steam, could be mixed anywhere in this embodiment, including mixing upstream of the hot oxygen nozzle of burner 1 or into reaction vessel 3 (as shown in FIG. 2).

Figure 2:
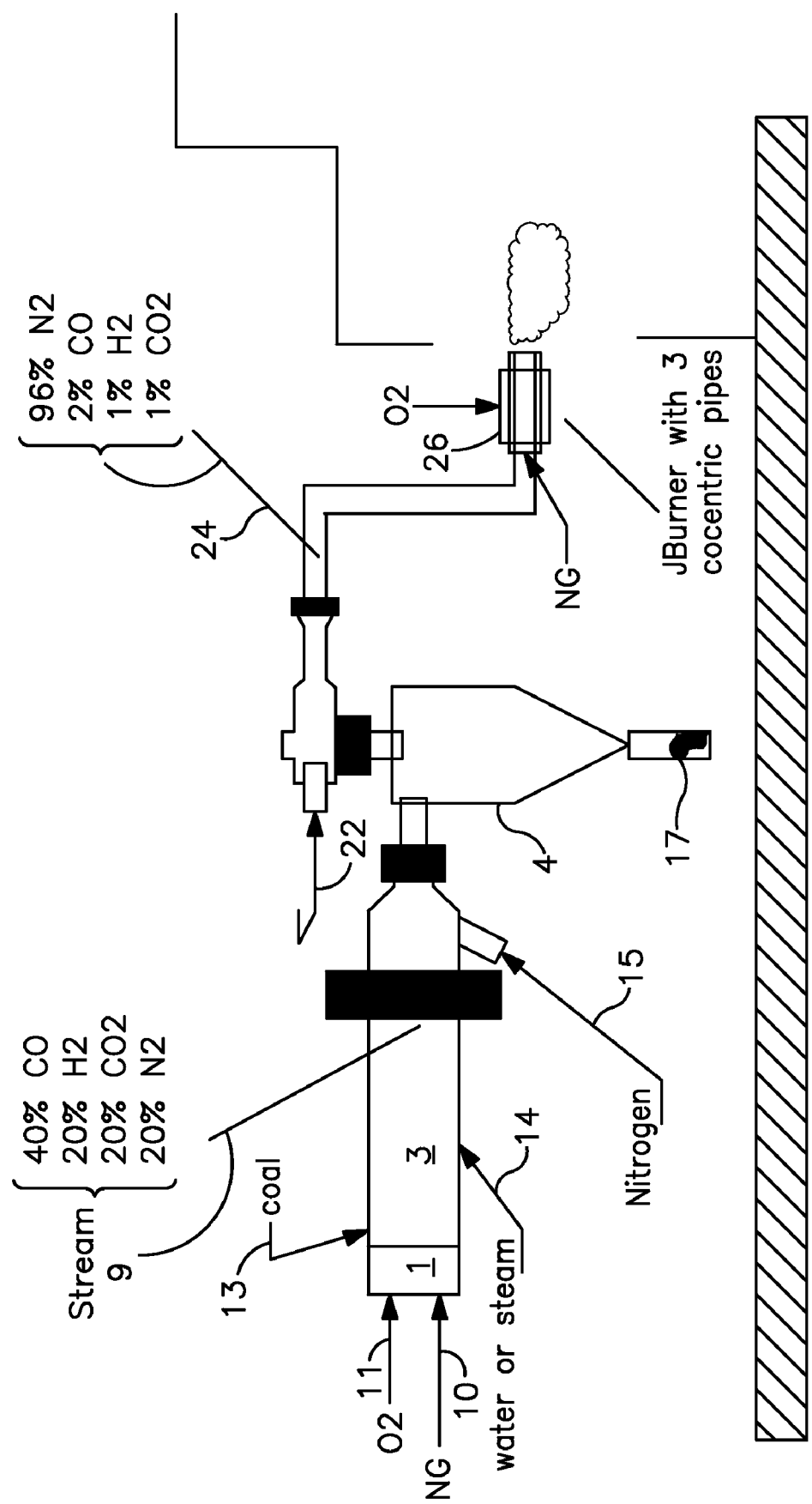
FIG. 2 illustrates a schematic view of apparatus to produce activated carbon in accordance with an alternative embodiment of the invention.

As further shown in FIG. 2, stream 9 may contain CO, $H_2$, $CO_2$ and $N_2$ (for example, about 40% CO, 20% $H_2$, 20% $CO_2$ and 20% $N_2$ of the gases on a dry basis in stream 9) in addition to the char produced in the reaction zone 3.

Nitrogen 15 is used to quench the products which are sent to cyclone 4. The use of nitrogen 15 as a quench media could be replaced with cooling tubes such that the composition of stream 9 is not altered. Alternatively, steam could be used as quench media 15. In this case, the concentration of hydrogen and carbon dioxide entering the cyclone would be altered from that in stream 9.

Cyclone 4 can be made from stainless steel. Combustible gasses can be flared using a natural gas-supported flame. Nitrogen 22 is used as an eductor gas to pump gases out of the cyclone. Gas 24 is thus heavily concentrated in nitrogen. Burner 26 shown in FIG. 2 is used for safety precautions in order to combust gases 24. As shown, the gases can be run through a natural gas-oxygen flare.

As further shown in FIG. 2, activated char 17 is collected from cyclone 4 and can be further processed and used as discussed above with reference to FIG. 1.

Figure 3:
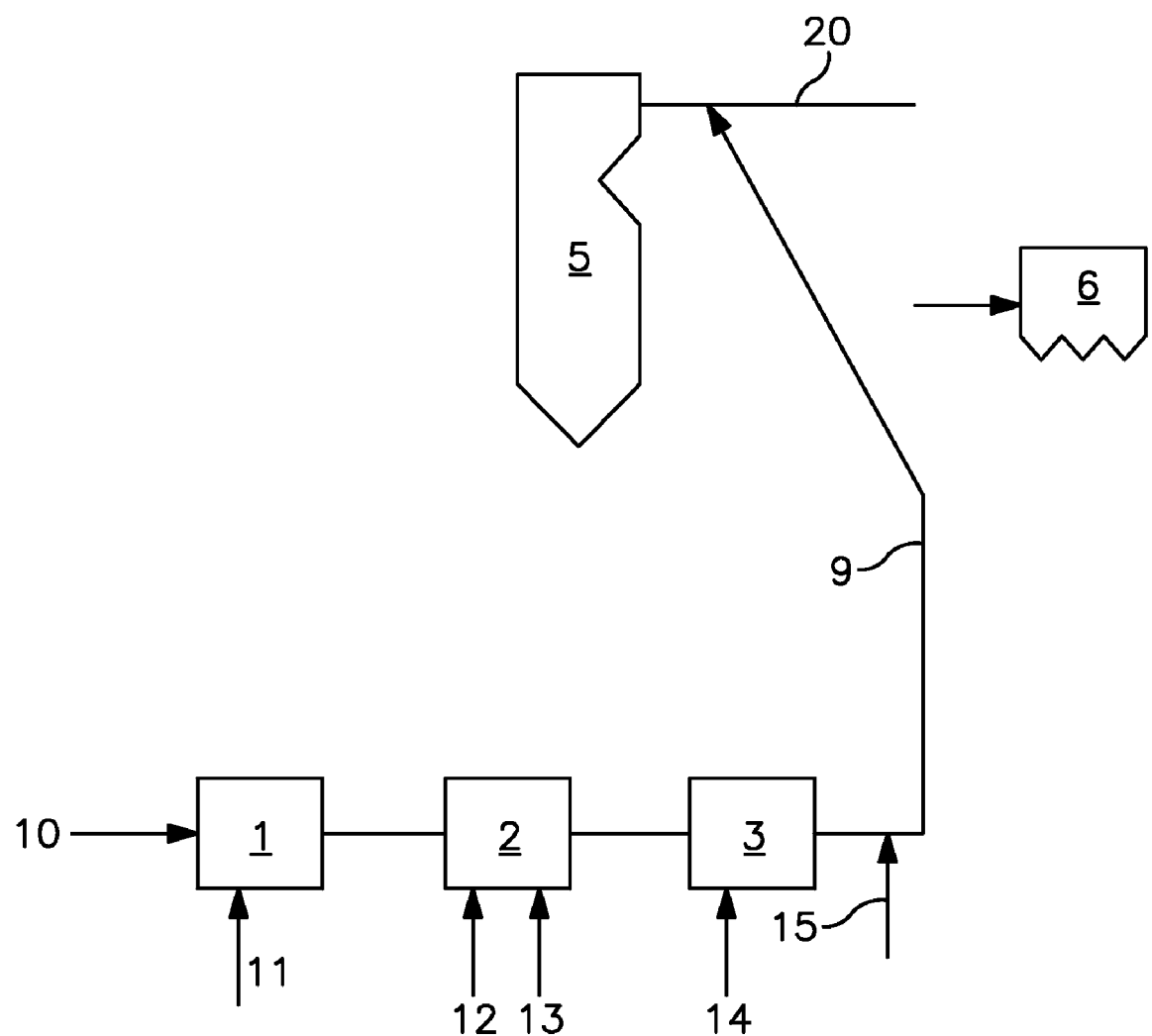
FIG. 3 illustrates a schematic view of apparatus to produce activated carbon in accordance with yet another alternative embodiment of the invention.

FIG. 1 illustrates the use of hot partial oxidation gases 19 as fuel to burner 1 to replace some, if not all, of fuel 10 to heat oxidant 11. Another configuration of the present invention is shown in FIG. 3. In this exemplary embodiment, products 9 from reaction vessel 3 could be injected directly into flue gas 20 for the removal of mercury from flue gas 20. It will be appreciated that stream 9 could be used for direct injection modes other than for the removal of mercury. As also shown in FIG. 3, stream 9 may be quenched using stream 15 as discussed hereinabove.

There is no combustion of the partial oxidation gases in the embodiment illustrated in FIG. 3. Accordingly, the activated char and partial oxidation gases formed in reactor 3 are injected together into flue gas 20. In situations where no cyclone is used, the point of injection of stream 9 (containing activated char and partial oxidation gases) is likely to be upstream in flue gas 20 relative to a configuration where a cyclone is used. This is due to the additional time needed to allow the partial oxidation gases to completely combust. The additional residence time and temperature of the flue gas 20 allows the carbon monoxide to burn out (i.e. completely combust). More specifically, the temperature of the flue gas at the point of injection in a configuration shown in FIG. 3 may be about 2000° F. as opposed to about 600° F. at the point of injection in FIG. 1.

Example 1

Several samples of activated char were produced using the experimental set-up illustrated in FIG. 2. Referring to FIG. 2, natural gas was used for stream 10, oxygen was used for stream 11 and Powder River Basin (PRB), North Dakota Lignite (NDL) or Utah coal were used for stream 13. The halide salts were added to the coal powder by dry or wet mixing.

Listed in Table 1 are the stoichiometric ratios (SR) used to make the activated chars and the resulting properties of the chars. For comparison purposes, the properties of Darco® FGD, a powder activated carbon commercially available from Norit America, Inc., is also listed in Table 1.

$SR_{HOB}$ was calculated by dividing the amount of oxygen fed in stream 11 by the amount of oxygen required to completely combust the natural gas fed in stream 10. $SR_{reaction\ vessel}$ was calculated by dividing the amount of oxygen entering the reaction vessel 3 by the amount of oxygen needed to completely combust the coal fed in stream 13.

The carbon content of the activated char was determined by using a muffle furnace to dry a sample of activated char and then to ignite the dried activated char sample. The carbon content was then calculated by dividing the difference between the initial mass and the final mass of the ignited sample by the initial mass of the dry activated char.

BET surface area of the activated char was measured using a Micromeritics® ASAP 2000 analyzer. It is noted that the BET surface area of raw PRB coal is 5 $m^2$/g.

The yield was calculated by using the carbon content of the activated char and by performing a material balance on the ash content of the coal fed in stream 13. The ash content on a wet basis is 4.47% for the PRB coal and 7.4% for North Dakota lignite coal. Mercury removals by the activated chars were evaluated using Electric Power Research Institute's (EPRI's) Pollution Control System (PoCT) at We Energies' Pleasant Prairie Power Plant at Pleasant Prairie, Wis., a 605 MW unit, as well as at a Western coal-fired utility with a conventional pulverized coal boiler rated at 350 MW. Both plants burn PRB coal. PoCT is a residence chamber used to simulate injection into the first field of a large scale ESP. During the mercury removal evaluation, a slipstream located upstream of the particulate control device of the host site was extracted and then injected into the PoCT. Residence times of about 2 and 4 seconds were tested and an activated char injection rate of about 6 lb/MMacf was used. Percent mercury removal was calculated by subtracting the outlet concentration of mercury from the inlet concentration of mercury and then dividing the sum by the inlet mercury concentration and multiplying by 100. Experiment number three was not evaluated for mercury removal. A more detailed description of the mercury removal experimental set-up can be found in Sjostrom, et al., "Assessing Sorbents for Mercury Control in Coal-Combustion Flue Gas", *Journal of the Air and Waste Management Association*, Vol. 52, p. 902-911 (August 2002).

In Experiment numbers 1-3 in Table 1, the coal used was PRB. In Experiment number 4, PRB coal with 1% by weight NaBr formed by dry mixing was used and in Experiment number 5, NDL coal with 0.5% NaBr formed by dry mixing was used. In Experiment 6, PRB coal with 7% by weight KBr formed by dry mixing was used. In Experiment 7, PRB coal with 7% by weight KBR formed by wet mixing was used. In Experiment 8, Utah coal with 1% by weight NaBr formed by dry mixing was used. In Experiment 9, NDL coal with 1% by weight NaBr formed by dry mixing was used.

TABLE 1

| Experiment Number | $SR_{HOB}$ | $SR_{Reaction\ Vessel}$ | Carbon Content % | Yield $\frac{lbchar}{lbcoal}$ | BET surface area $\frac{m^2}{g}$ | Mercury Removal 2 seconds residence time % | Mercury Removal 4 seconds residence time % |
|---|---|---|---|---|---|---|---|
| 1 | 6 | 0.7 | 58 | 0.11 | 237 | 41 | 44 |
| 2 | 6 | 0.3 | 82 | 0.25 | 225 | 22 | 24 |
| 3 | 3 | 0.3 | 81 | 0.24 | 361 | ND | ND |
| Darco ® FGD | NA | NA | 72 | NA | 474 | 48 | 56 |
| 4 | 3 | 0.5 | 60 | 0.11 | ND | 68 | 76 |
| 5 | 3 | 0.45 | 53 | 0.16 | ND | 30 | 63 |
| 6 | 3 | 0.3 | 81 | 0.24 | ND | 65 | 72 |
| 7 | 6 | 0.5 | 48 | 0.09 | 519 | 93 | 94 |
| 8 | 3 | 0.3 | ND | ND | ND | 56 | 82 |
| 9 | 4 | 0.3 | ND | ND | ND | 85 | 90 |

In Table 1, "ND" refers to not determined. As shown in Table 1, as $SR_{HOB}$ was decreased, while holding $SR_{Reaction\ Vessel}$ constant, the surface area increased. This is believed to be a result of the increased temperature and steam amount of the stream leaving section 1 of FIG. 2. Temperature, the amount of oxidant and the exposure time of the char to the oxidant are important factors in determining the surface area. Generally, increasing any of the three factors increases the surface area.

Also, when $SR_{Reaction\ Vessel}$ was increased, yield and carbon content decreased, surface area increased and mercury removal increased. It is believed that the yield and carbon content decreased because more oxygen was supplied to the reaction vessel and as a result more carbon was consumed. It is also believed that the surface area increased as a result of the explanation given above for increased surface due to increased $SR_{HOB}$.

In Experiments 7-9, steam was injected into the product from 17 in FIG. 2. It is known by those skilled in the art that steam activation can enhance the adsorption capacity of activated carbons. While steam activation may not be necessary in every case, it is believed that this along with the addition of halide salts is the reason for the high mercury removals in experiments 7-9.

If the invention is used to produce activated char at a central facility such as a utility or cement kiln or a facility where the off-gas can be burned, the partial oxidation gases could be used in a boiler (or the burner) and the cooled activated char could be stored for use elsewhere. Alternatively or in addition, the activated char could be further processed (i.e. post-processed) to achieve specific desired characteristics (e.g., steam treatments to increase surface area) or doping of the activated char with a halide salt such as those disclosed commonly owned U.S. patent application Ser. No. 11/078,509, entitled "Catalytic Adsorbents For Mercury Removal From Flue Gas and Methods of Manufacture Therefor" to Chien-Chung Chao et al., filed on Mar. 14, 2005 and commonly owned U.S. patent application Ser. No. 11/224,149, entitled "Catalytic Adsorbents For Mercury Removal From Flue Gas and Methods of Manufacture Therefor" to Chien-Chung Chao et al., referenced hereinabove.

In other embodiments of the invention, a hot gas stream other than hot oxygen can be created and used to activate the carbonaceous feedstock material. For example, steam could be dramatically superheated by mixing the steam with the products of a near stoichiometric oxy-fuel burner. This superheated steam would then be used to react with, and activate the carbonaceous feedstock. It will also be appreciated by those skilled in the art that if it is desirable to solely pyrolyze (i.e., without combustion), then other gasses such as nitrogen could also be superheated in a similar fashion to pyrolyze the coal. In this particular embodiment, no residual oxygen would be present in stream 7 (see figures above).

As discussed above, the present invention provides methods and systems for production of activated char that are sufficiently flexible and efficient such that production can occur near or at the end use site of the activated char. It will be appreciated, however, that production of the activated chars in accordance with the present invention is not limited to onsite production. The methods and systems provided herein can also be used in other arrangements. For example and while not to be construed as limiting, activated char produced by the present invention could be produced at a central facility and used to serve multiple utilities or the like. Another exemplary implementation could include producing activated char at a utility for that plant and shipping excess activated char to other locations. It will also be appreciated that the activated chars produced in accordance with the present invention can be used to replace PAC production used for other applications. The present invention thus provides versatility and flexibility with respect to the site of production.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A method for producing activated char, the method comprising:
   generating a superheated gas stream comprising an inert gas, the gas stream having a temperature of at least 800° F.;

mixing carbonaceous feedstock with the superheated gas stream such that the carbonaceous feedstock undergoes devolatilization and pyrolysis, thereby producing activated char and byproducts, further comprising quenching the powdered activated char with a quenching media, wherein the quenching media includes a dopant for doping the activated char.

2. The method of claim 1, wherein the dopant is KBr.

3. A method for producing activated char, the method comprising:

generating a superheated gas stream comprising an inert gas, the gas stream having a temperature of at least 800° F.;

mixing carbonaceous feedstock with the superheated gas stream such that the carbonaceous feedstock undergoes devolatilization and pyrolysis, thereby producing activated char and byproducts, wherein the activated char is further treated with steam to increase the surface area thereof.

4. A method for producing activated char, the method comprising:

generating a superheated gas stream comprising an inert gas, the gas stream having a temperature of at least 800° F.;

mixing carbonaceous feedstock with the superheated gas stream such that the carbonaceous feedstock undergoes devolatilization and pyrolysis, thereby producing activated char and byproducts, further comprising quenching the powdered activated char with a quenching media, wherein the quenching media comprises nitrogen, wherein the activated char is further treated with steam to increase the surface area thereof.

5. A method for producing activated char, the method comprising:

generating a superheated gas stream comprising an inert gas, the gas stream having a temperature of at least 800° F.;

mixing carbonaceous feedstock with the superheated gas stream such that the carbonaceous feedstock undergoes devolatilization and pyrolysis, thereby producing activated char and byproducts, further comprising adding a secondary reactive gas prior to mixing the carbonaceous feedstock with the at least one gas stream.

6. The method of claim 5, wherein the secondary reactive gas stream comprises steam.

7. A method for producing activated char, the method comprising:

generating a superheated gas stream comprising an inert gas, the gas stream having a temperature of at least 800° F.

mixing carbonaceous feedstock with the superheated gas stream such that the carbonaceous feedstock undergoes devolatilization and pyrolysis, thereby producing activated char and byproducts, wherein the carbonaceous feedstock contains a dopant, wherein the dopant comprises NaBr, KBr or mixtures thereof.

* * * * *